(12) United States Patent
Juranka

(10) Patent No.: US 8,523,574 B1
(45) Date of Patent: Sep. 3, 2013

(54) MICROPROCESSOR BASED VOCABULARY GAME

(76) Inventor: Thomas M. Juranka, Toronto (CA)

(*) Notice: Subject to any disclaimer, the term of this patent is extended or adjusted under 35 U.S.C. 154(b) by 799 days.

(21) Appl. No.: 12/563,976

(22) Filed: Sep. 21, 2009

(51) Int. Cl.
*G09B 19/00* (2006.01)

(52) U.S. Cl.
USPC .......................................... 434/156; 434/167

(58) Field of Classification Search
USPC .................................................. 434/156, 167
See application file for complete search history.

(56) References Cited

U.S. PATENT DOCUMENTS

| | | | | |
|---|---|---|---|---|
| 6,094,633 A | * | 7/2000 | Gaved et al. | 704/260 |
| 2001/0046658 A1 | * | 11/2001 | Wasowicz | 434/167 |
| 2006/0194175 A1 | * | 8/2006 | De Ley et al. | 434/169 |
| 2007/0255570 A1 | * | 11/2007 | Annaz et al. | 704/270 |

* cited by examiner

*Primary Examiner* — Xuan Thai
*Assistant Examiner* — Jerry-Daryl Fletcher
(74) *Attorney, Agent, or Firm* — Michael I. Kroll

(57) ABSTRACT

An educational word game for play on a cell phone or hand held device that utilizes the linguistic concept of onsets and rimes in order to teach and develop skills in pairing and forming appropriate sets of said onset and rimes in order to form full words.

17 Claims, 12 Drawing Sheets

MICROPROCESSOR BASED VOCABULARY GAME

BACKGROUND OF THE INVENTION

1. Field of the Invention

The present invention relates generally to a word game for play on a cell phone, handheld device or computer and, more specifically, to the linguistic concept of onsets and rimes (the consonant(s) that precedes the first vowel is the onset and the first vowel and letters that follow is the rime). In some instances the onset is not a single consonant but rather a consonant blend like the "bl" in "blend." In other cases, the rime is a single vowel like "e" in "me" or "the". The number of rimes in a word corresponds to the number of syllables it has. This game pairs different onsets with rimes.

2. Description of the Prior Art

There are other word game devices designed for linguistic purposes. Typical of these is U.S. Pat. No. 1,642,424 issued to Massery on Sep. 13, 1927.

Another patent was issued to Thompson, et al. on Oct. 9, 1990 as U.S. Pat. No. 4,961,579. Yet another U.S. Pat. No. 5,249,965 was issued to Yianilos on Oct. 5, 1993 and still yet another was issued on Feb. 28, 1995 to Cember as U.S. Pat. No. 5,939,062.

Another patent was issued to Latypov on Jun. 13, 1995 as U.S. Pat. No. 5,423,556. Yet another U.S. Pat. No. 5,921,864 was issued to Walker, et al. on Jul. 13, 1999. Another was issued to Gaved, et al. on Jul. 25, 2000 as U.S. Pat. No. 6,094,633 and still yet another was issued on Aug. 8, 2000 to Kennedy as U.S. Pat. No. 6,098,983.

Another patent was issued to Lund on Jul. 2, 2002 as U.S. Pat. No. 6,412,781. Yet another U.S. Pat. No. 6,450,499 was issued to Letang on Sep. 17, 2002. Another was issued to Anderson on Nov. 1, 2000 as U.K. Patent No. GB2349344 and still yet another was issued on Jan. 12, 2005 to Anderson as U.K. Patent No. GB2403661. Another patent was issued to Anderson on Nov. 26, 2008 as U.K. Patent No. GB2449460.

U.S. Pat. No. 1,642,424

Inventor: E. M. Massey

Issued: Sep. 13, 1927

A word game in particular a puzzle relating to arrangements of letters to be printed in newspapers, magazines, or books, or in the form of a card game. The puzzle comprises continuous rows of random letters, among which are hidden words corresponding to descriptions or definitions. The puzzle is solved by marking the words once they are found among the random letters.

U.S. Pat. No. 4,961,579

Inventor: Barbara J. Thompson et al

Issued: Oct. 9, 1990

An electronic puzzle game device for players/students. The device includes a memory for storing code corresponding to a plurality of sets of alpha-numeric symbols, each set comprising a puzzle. A display is provided for visibly indicating a selected puzzle. In the preferred embodiment, a player can vary the degree of difficulty of the displayed puzzle which generally includes a topic together with a selected number of letter cues. A player or student will preferably list words which start with the randomly selected letter cues and correspond to the displayed topic. A timer serves to determine the length of time period a player has to solve the puzzle. In one embodiment, audible signals, including the counting down of the timer and the ending of the timer cycle are provided.

U.S. Pat. No. 5,249,965

Inventor: Peter N. Yianilos

Issued: Oct. 5, 1993

An improvement in an electronic crossword puzzle solving machine to provide alternate words for a word that is input on the keyboard. A first actuation of a function key labeled "Second-Guess" initiates a search in which all words in memory having the same number of letters as the input word but differing with respect to only one of those letters is displayed. A second actuation of the "Second-Guess" key results in a search and display of all words differing from the input word with respect to tow of the letters. Each successive actuation of the "Second-Guess" key increases the number of letters by which the alternate words found differ from the input word.

U.S. Pat. No. 5,393,062

Inventor: Robert P. Cember

Issued: Feb. 28, 1995

The present invention is a word game to be played by two or more persons, in which the object of the game is to assemble solutions to word transformation puzzles. The game of the present invention requires the use of a computer (or processor), a display, and a keyboard (or other input device). At the beginning of the game and at various times during the game, the processor must find a solution to a word transformation puzzle or determine that one does not exist. Efficient solution of puzzle by the processor is accomplished by creating tow minimum-length search trees, each tree having a number of nodes that contain words generated via a predetermined relationship with respect to one another. The first tree is based on the first Doublet word (the source), while the second tree is based on the second Doublet word (the destination). An intersection of the two search trees are stored in memory in such a fashion that the path from the root of the tree to any node may be recovered.

U.S. Pat. No. 5,423,556

Inventor: Nourakhmed Latypov

Issued: Jun. 13, 1995

An interactive computer game uses a digital computer system with a display and an interactive means for communicating user input to the computer system. The system displays on the display an array of elements in rows and columns, each of the elements having a feature distinguishable by a player of the game. In addition, at least one element can be moved by the user via the interactive means. This element can be added at one end of a row or column by one element and removing another element from an opposite end of the row or column. When a row or column is formed in which the elements have a predetermined pattern of features, that row or columns is erased from the display. If, within a given time interval, a player is unable to build such a row or column which has a predetermined pattern of features, the system adds a new row or column of elements to the display.

U.S. Pat. No. 5,921,864

Inventor: Jay S. Walker

Issued: Jul. 13, 1999

An electronic word puzzle game playable on a game computer having a processor for executing at least on program from associated memory, a display and an I/O interface, comprising: at least one puzzle phrase in the associated memory; a game program in the associated memory executable by the processor for randomly or deterministically choosing a solution phrase from the associated memory, the solution phrase comprising at least one of letters, spaces and punctuation marks; the I/O interface adapted for enabling the player to select at least one of letters, spaces and punctuation marks from a selection of entry keys associated with the I/O interface; the game computer generating and displaying a plurality of solution phrase constituent display areas, wherein each of said solution phrase constituent display areas corresponds to each letter, blank space, and punctuation mark of the solution phrase, on the display screen; the game program executable by the processor for comparing the at least one selected letter to the letters in the solution phrase and displaying on the display screen the selected letter in each grid box corresponding to a letter of the solution phrase for each player selected letter found in the solution phrase; and the game computer displaying the corresponding grid box at least one of blank spaces and punctuation marks of the solution phrase adjacent to a selected letter found in the solution phrase. In an alternative embodiment, the electronic word puzzle game capable of being played at a user terminal over a data network in accordance with the invention.

U.S. Pat. No. 6,094,633

Inventor: Margaret Gaved et al.

Issued: Jul. 25, 2000

Synthetic speech is generated from conventional texts and in particular by converting text in graphemes into a text in phonemes. The grapheme text is analyzed into rimes and onsets, and each word is analyzed from the end so that earlier-occurring segments are at least partially defined by the identification of the later-occurring segments. It is a particular feature that an internal string of consonants, i.e., a string of consonants preceded and followed by a vowel, is split into two portions, namely, a second portion which is contained in a database of onsets, and an earlier portion which, together with the preceding vowel or vowels, is contained in a database of rimes.

U.S. Pat. No. 6,098,983

Lovie Kennedy

Aug. 8, 2000

A word game is provided including at least on sheet of paper having a top face, a bottom face, and a periphery formed therebetween. The top of each sheet has a plurality of unique horizontally oriented words printed thereon. A large blank space is situated between each word. Also included is a time keeper for providing an indication upon the cessation of a predetermined amount of time.

U.S. Pat. No. 6,412,781

Inventor: N. Richard Lund

Issued: Jul. 2, 2002

A collection of playing pieces for a vocabulary word game is disclosed. The pieces contain on one face a multi-letter combination of at least two letters plus a designator indicating required location of the letter combination in words. During a playing interval on playing piece is displayed to all players. Each player writes a list of words containing the selected letter combination at the designated location in the words. After a predetermined time limit the players reveal their list to all. The winner of the playing interval is the player with the greatest number of words on their list. The game continues for a chosen number of intervals, the game winner being the player winning the greatest number of individual playing intervals.

U.S. Pat. No. 6,450,499

Inventor: Henry A. Letang

Issued: Sep. 17, 2002

The present invention is an educational word game and method of playing same that may be provided in single or bi-lingual versions and that challenges players to form as many new words from a set of at least two base words as possible within a limited amount of time. The word game requires that the players define a set of rules for each game prior to play and by the random selection of round prize amounts and the letter length of at least two base words, and thus the number and type of letters players may use to form new words. Base word letter length and prize amounts are determined by spinning the pointed on the board. Players fill in a game rules sheet. By requiring that two or more base words be used, the number, length, and sophistication of words a player may potentially make is greatly expanded.

U.K. Patent Number GB349344

Inventor: Thomas Michael Andreson

Issued: Nov. 1, 2000

This invention relates to Apparatus for word games. Tiles for playing word games have an anagram missing a vowel on one side and a solution on the other side which takes the form of a listing of all possible words corresponding to the anagram in full.

U.K. Patent Number GB2403661

Inventor: Thomas Michael Andreson

Issued: Jan. 12, 2005

This invention relates to apparatus for education and for word games. A plurality of tiles and or cards with an anagram printed on one side. More words may be created by the addition of one or more vowels to form at least two more words on each card. The possible solutions are printed on the reverse of the card.

U.K. Patent Number GB2449460

Inventor: Thomas Michael Anderson

Issued: Nov. 26, 2008

This invention takes word games, as presented by an Anagram or a start word to a whole new level. A word game comprises a start word or anagram which is used to form other words by the addition or removal of a vowel. The game may be played as a board game, or be printed in magazines, newspapers, books or promotional literature.

While these word games may be suitable for the purposes for which they were designed, they would not be as suitable for the purposes of the present invention, as hereinafter described.

SUMMARY OF THE PRESENT INVENTION

A primary object of the present invention is to provide a word game. Another object of the present invention is to provide a word game which combines letters to form words.

Yet another object of the present invention is to provide a word game which combines letters to form words that consist of one syllable.

Still yet another object of the present invention is to provide a word game which combines letters to form words that consists of multiple syllables.

Another object of the present invention is to provide a word game that combines onsets with rimes to form said words with syllables.

Yet another object of the present invention is to provide a word game in which players are encouraged to build larger words for extra points.

Still yet another object of the present invention is to provide a word game which gives a different amount of points based on the number of syllables (or onsets combined with rimes) that are formed in each word.

Another object of the present invention is to provide a word game which gives a difficulty score based on the commonness or rareness of the formed one syllable words which have been predetermined from dictionary analysis.

Yet another object of the present invention is to provide a word game which can be played electronically.

Still yet another object of the present invention is to provide a word game for use on a cell phone or other handheld device.

Another object of the present invention is to provide a word game for online play using the Internet.

Yet another object of the present invention is to provide a word game which provides definitions of formed words in a separate window appearing on the game screen.

Still yet another object of the present invention is to provide a word game which players have the option to aesthetically customize the word game to their preferences.

Additional objects of the present invention will appear as the description proceeds.

The present invention overcomes the shortcomings of the prior art by providing an educational word game for play on a cell phone or hand held device that utilizes the linguistic concept of onsets and rimes in order to teach and develop skills in pairing and forming appropriate sets of said onset and rimes in order to form full words.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 8A:
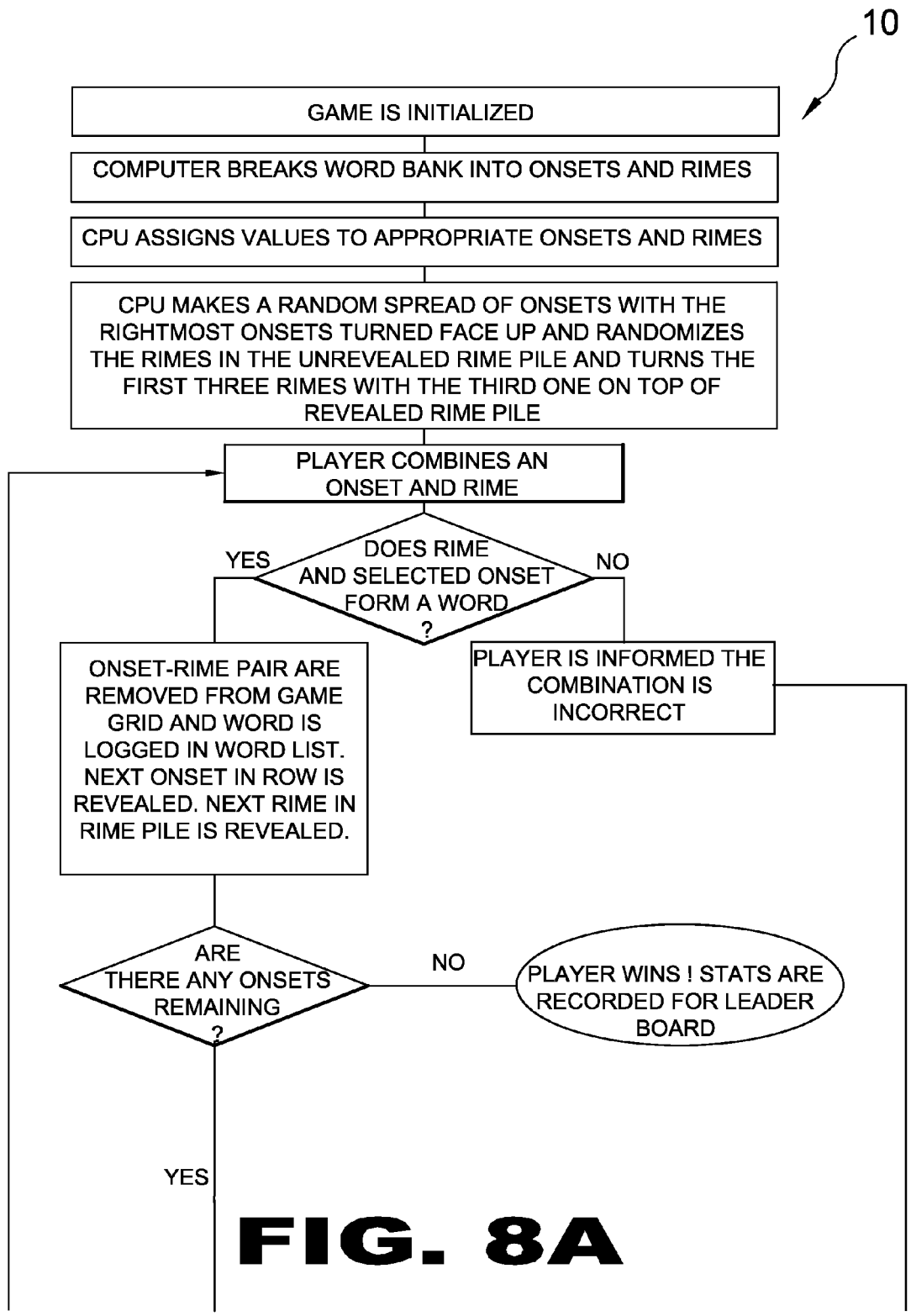
Figure 8B:
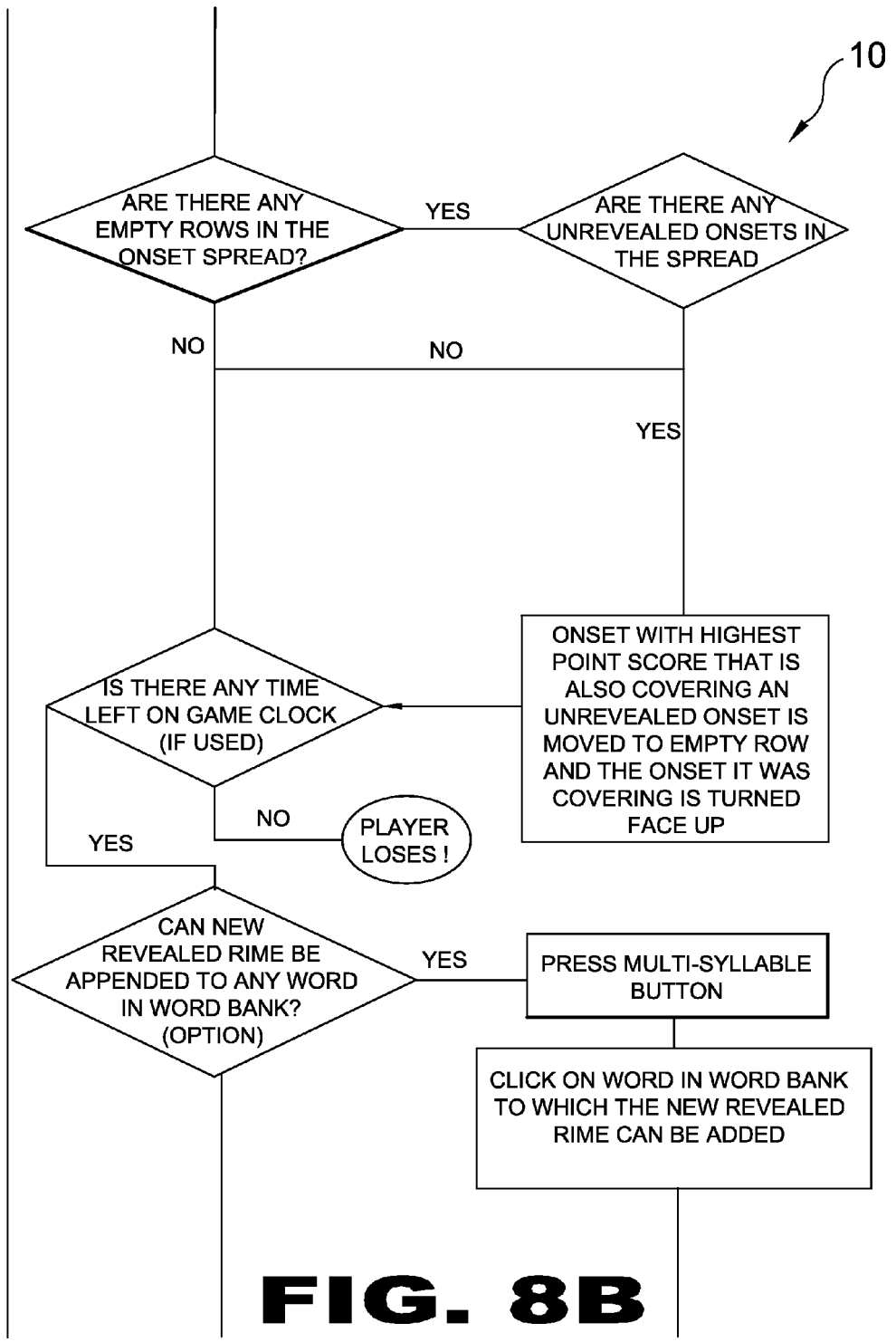
Figure 8C:
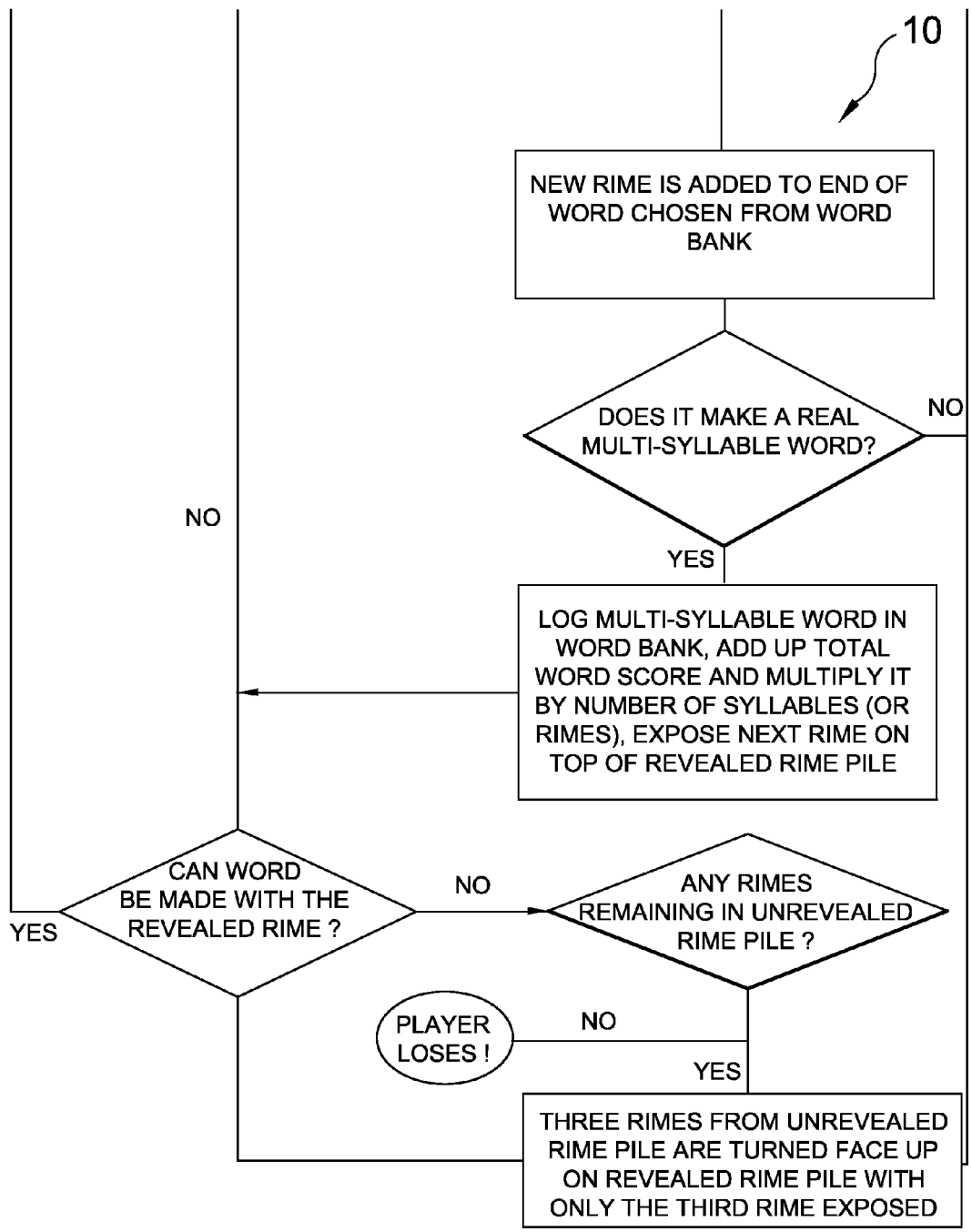
Figure 9:
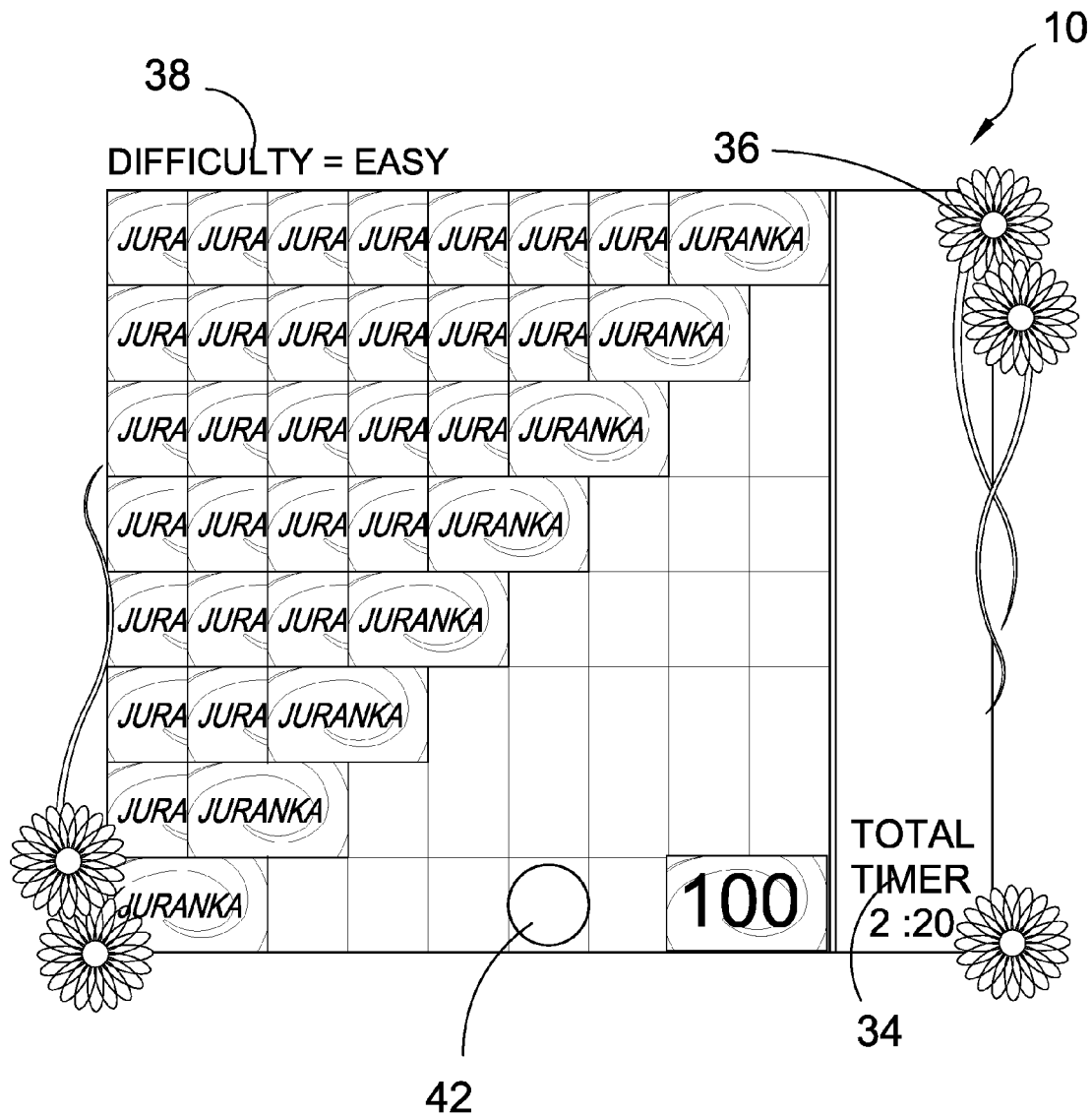
Figure 10:
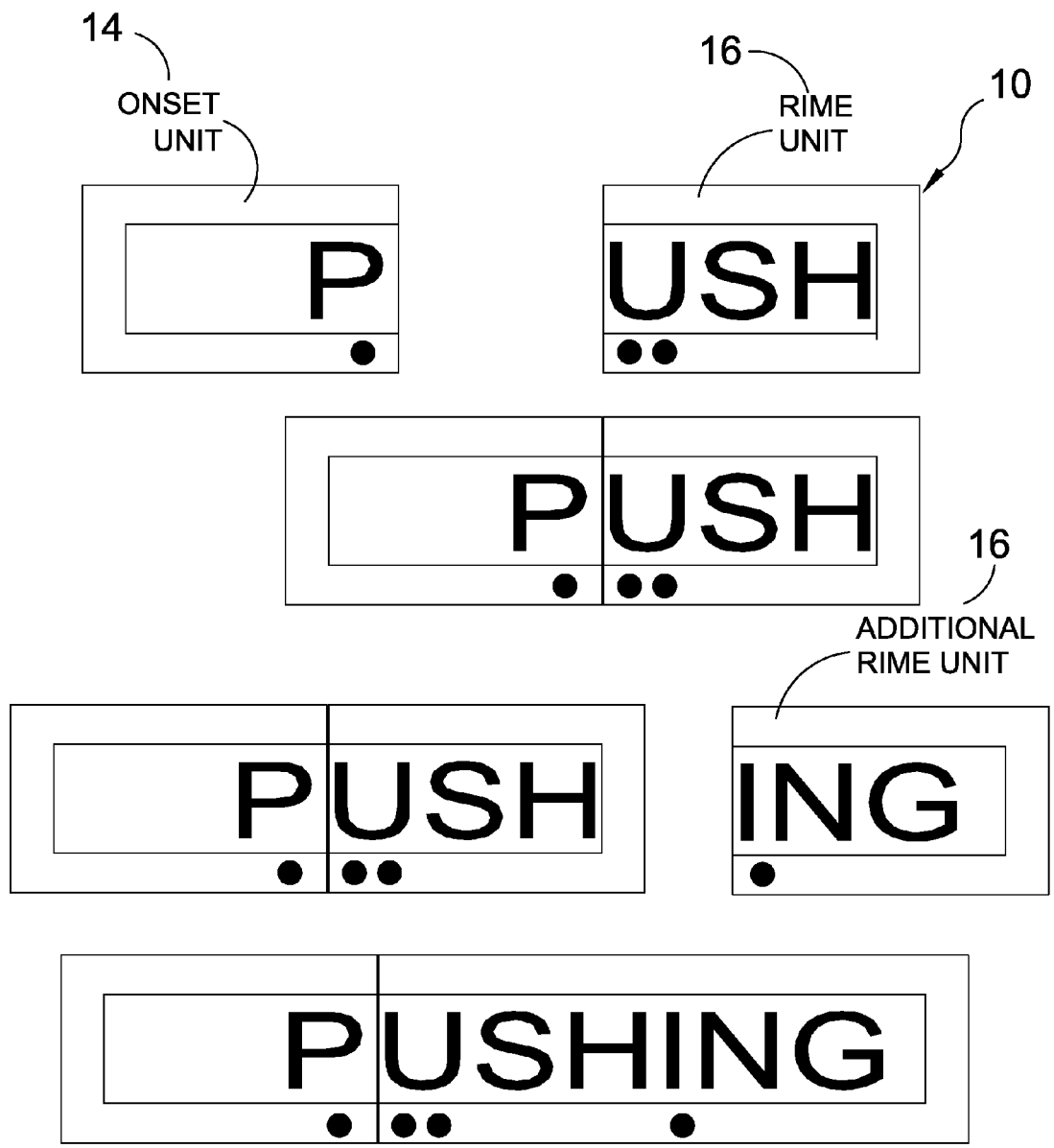

FIGS. 8A-C is a flow chart of the vocabulary game;

FIG. 9 is a display of additional elements of the microprocessor based vocabulary game; and FIG. 10 is an illustrative view of another additional element of the present invention in use.

DESCRIPTION OF THE REFERENCED NUMERALS

Turning now descriptively to the drawings, in which similar reference characters denote similar elements throughout the several views, the figures illustrate the Microprocessor Based Electronic Vocabulary Game of the present invention. With regard to the reference numerals used, the following numbering is used throughout the various drawing figures.

10 Microprocessor Based Electronic Vocabulary Game of the present invention
12 hand-held mobile electronic device
14 onset unit (face up)
16 rime unit (face up)
18 user
20 cell phone
22 computer
24 unrevealed onset spread
26 unrevealed rime pile
28 word bank
30 complete word
32 unrevealed unit
34 timer
36 aesthetically enhanced skins
38 difficulty rating
40 grid
42 multi-syllable button

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well, including but not limited to multiplayer embodiments and embodiments that allow for the construction of multi-rime (multi-syllable) words. For definition of the complete scope of the invention, the reader is directed to appended claims.

Figure 1:
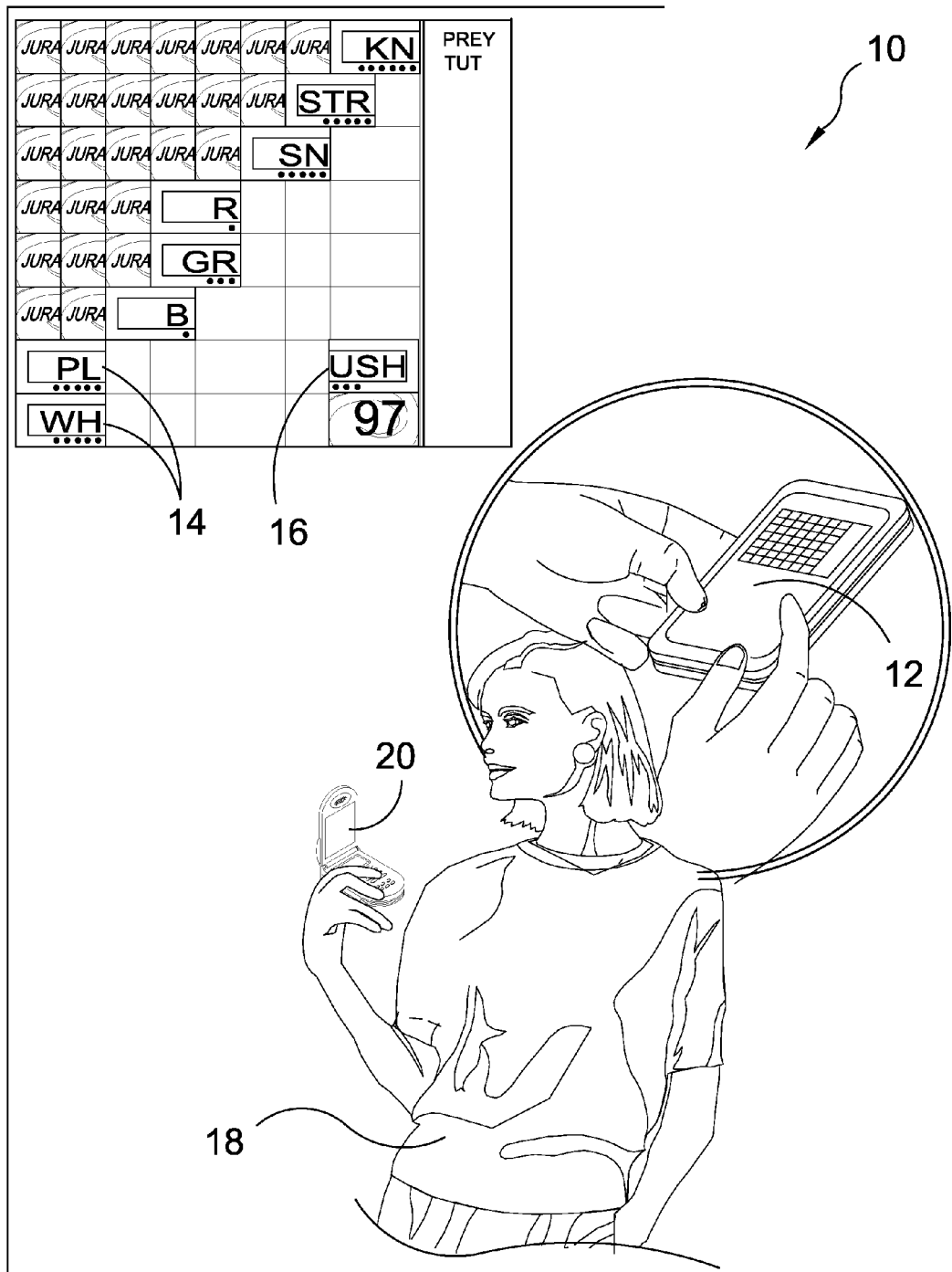
FIG. 1 is an illustrative view of the microprocessor based vocabulary game.

FIG. 1 is an illustrative view of the microprocessor based vocabulary game 10. Shown is the user 18 with the invention, a game for play on a hand-held device 12 such as but not limited to an iPhone, Palm and Blackberry device, or cell phone 20, and computer that utilizes the linguistic concept of onsets 14 and rimes 16 in order to teach and develop skills in pairing these syllable segments in order to form full words.

Figure 2:
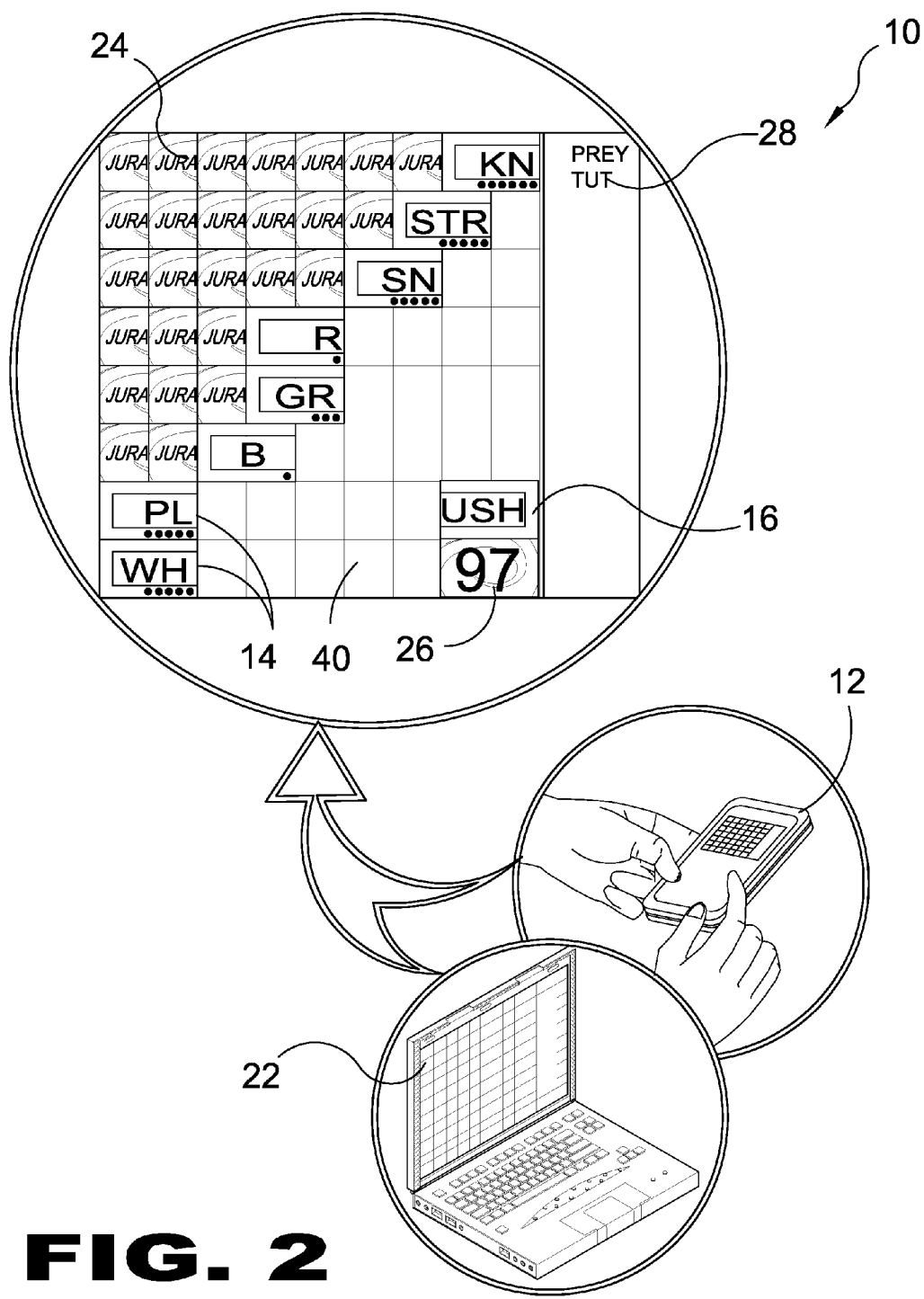
FIG. 2 is an illustrative view of the vocabulary game in use.

FIG. 2 is an illustrative view of the vocabulary game 10 in use. Shown is the present invention, a game for play on a microprocessor device, such as a hand-held electronic device 12 or computer 22 that utilizes the linguistic concept of onsets 14 and rimes 16 in order to teach and develop skills in pairing and forming appropriate sets of said onset and rimes in order to form full words. The game is played on a grid 40 having a spread of unrevealed onsets 24 with final unit of each row revealed 14 (face up), and an unrevealed rime pile 26 from which a revealed rime 16 is taken. Also provided is a word bank 28.

Figure 3:
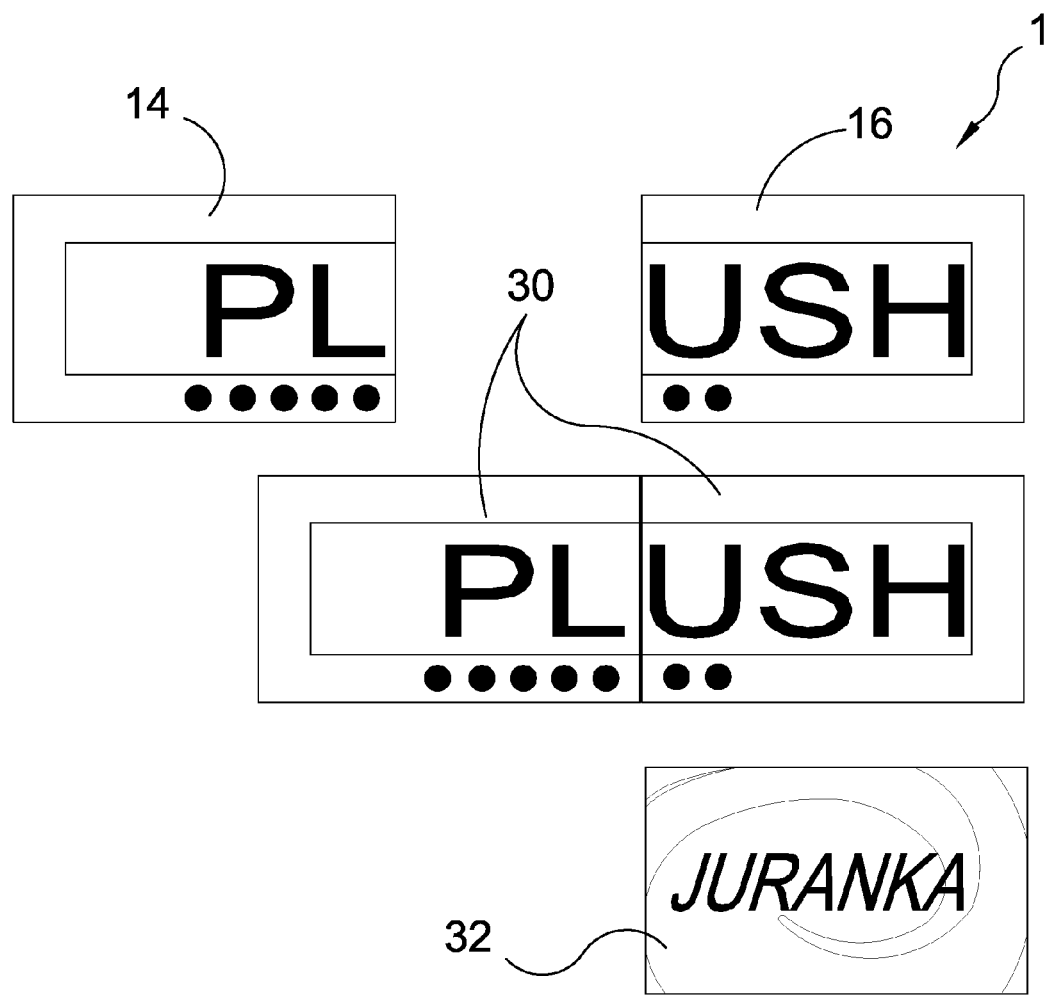
FIG. 3 is an illustrative view of the vocabulary game in use.

FIG. 3 is an illustrative view of the vocabulary game 10 in use. Shown are a plurality of word segments comprising onset units 14 that signify the consonant or consonant blend that precedes the first vowel of a word and have corresponding characters marked thereon. Rime units 16 start with a vowel and are one syllable long. Onset units 14 and rime units 16 are paired to form a complete word 30. Unrevealed onset units 32 are face down and show the logo until they can be turned up and brought into play.

Figure 4:
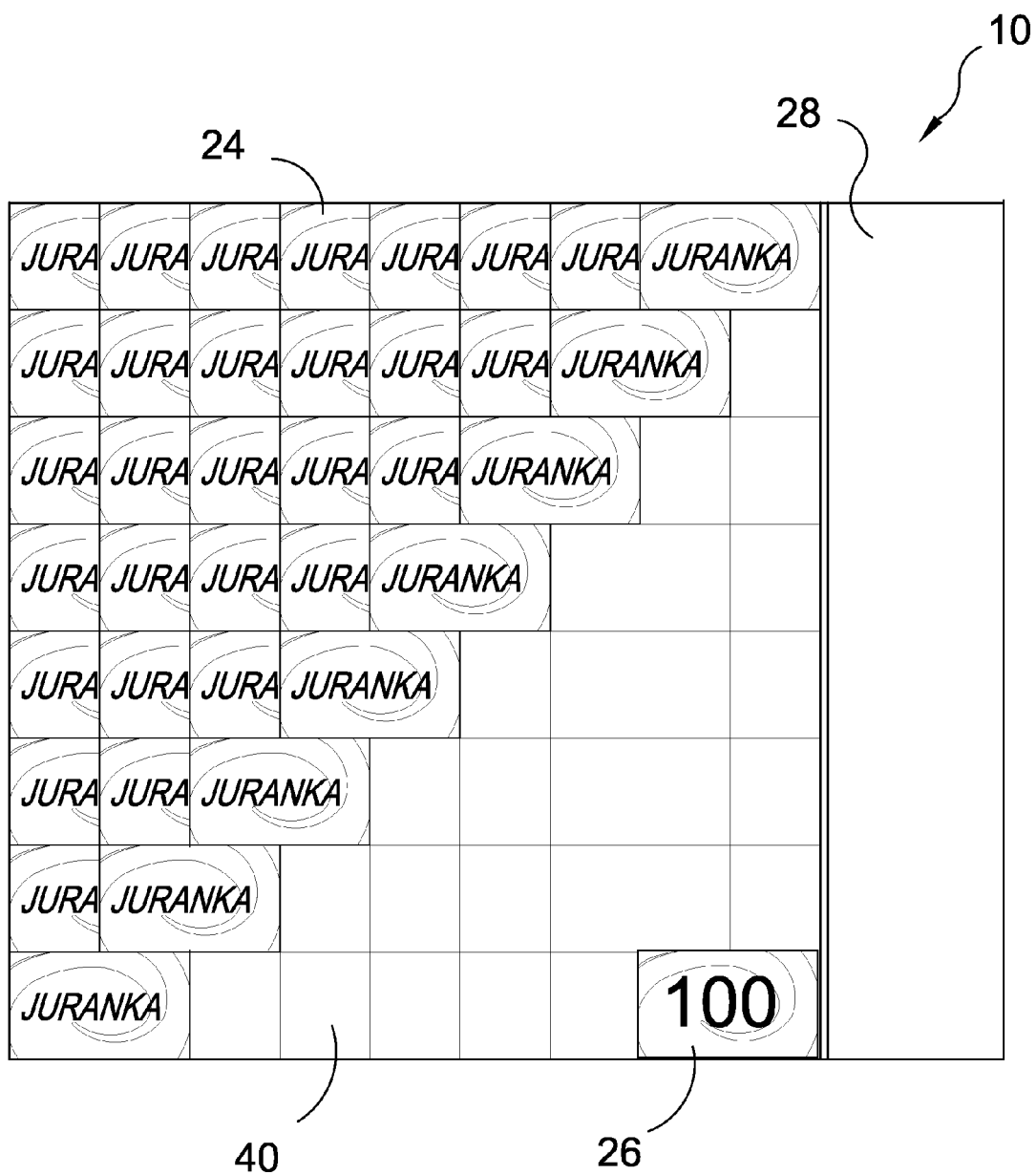
FIG. 4 is an illustrative view of one embodiment of a start display.

FIG. 4 is an illustrative view of one embodiment of a start display of the present invention 10. Shown is one possible beginning arrangement of the grid 40, the unrevealed onset spread 24 and unrevealed rime pile 26 used for gameplay. Units situated in the top left half are onsets 24 while units in the lower righthand corner are stacked rime units 26. The number on top of the unrevealed rimes stack 26 indicates the number of unrevealed rimes in pile. At this stage the starting number of unrevealed rimes may be 100. The word bank 28 is depicted on the right side.

Figure 5:
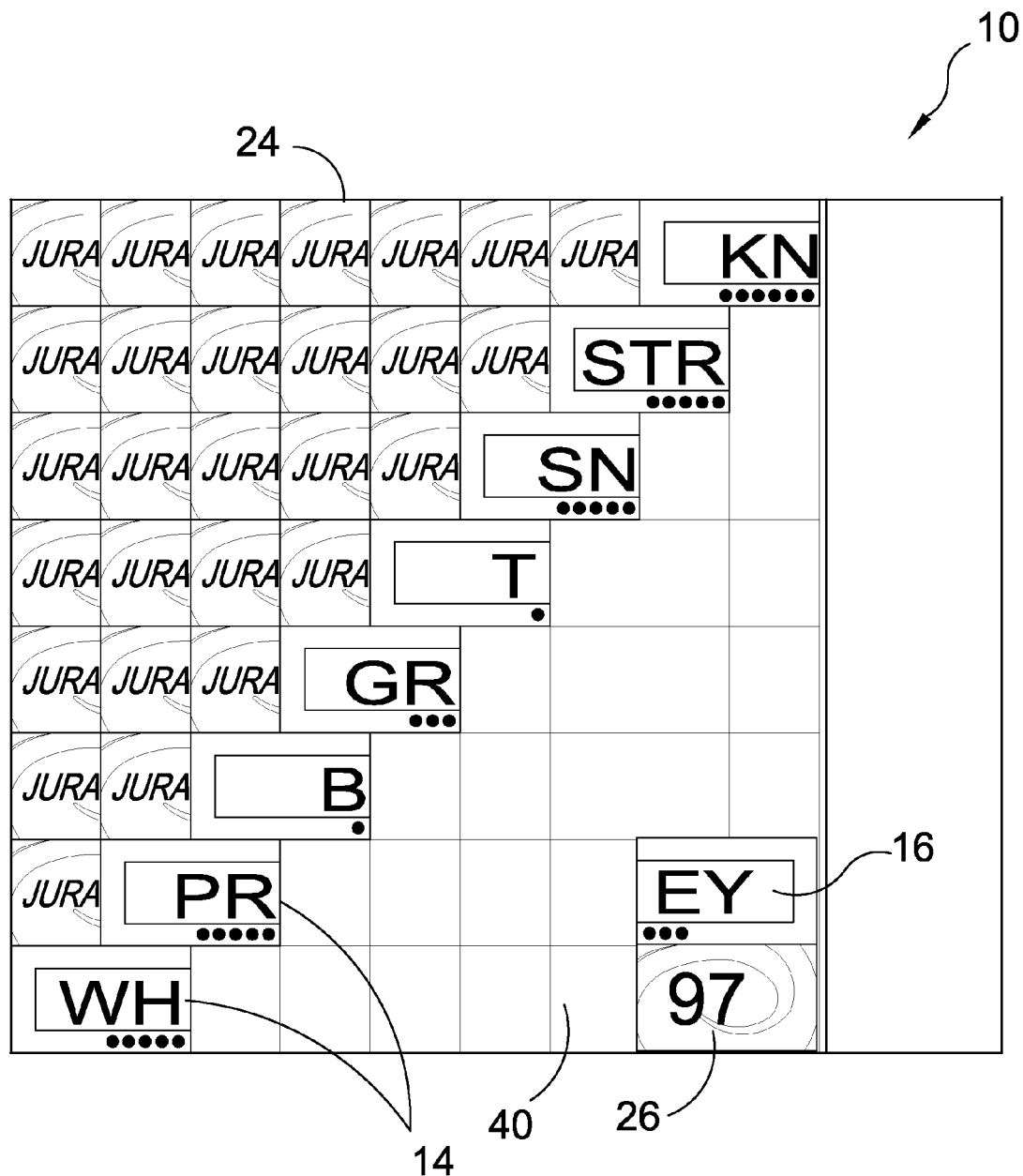
FIG. 5 is an illustrative view of one embodiment of a game display.

FIG. 5 is an illustrative view of one embodiment of a game display. Shown is the present invention 10 displaying a freshly distributed game on the grid 40 with rows of unrevealed onsets 24 whereby the right most onset 14 of each row is revealed. The top revealed rime 16 card of the first set of three overturned rimes from the supply of stacked rime units in the unrevealed rime pile 26. The number on the unrevealed rime stack 26 is 97 at this stage because rimes are turned three at a time with only the top card being available. The card below the top rime card is only accessible once the top rime card is successfully paired.

Figure 6:
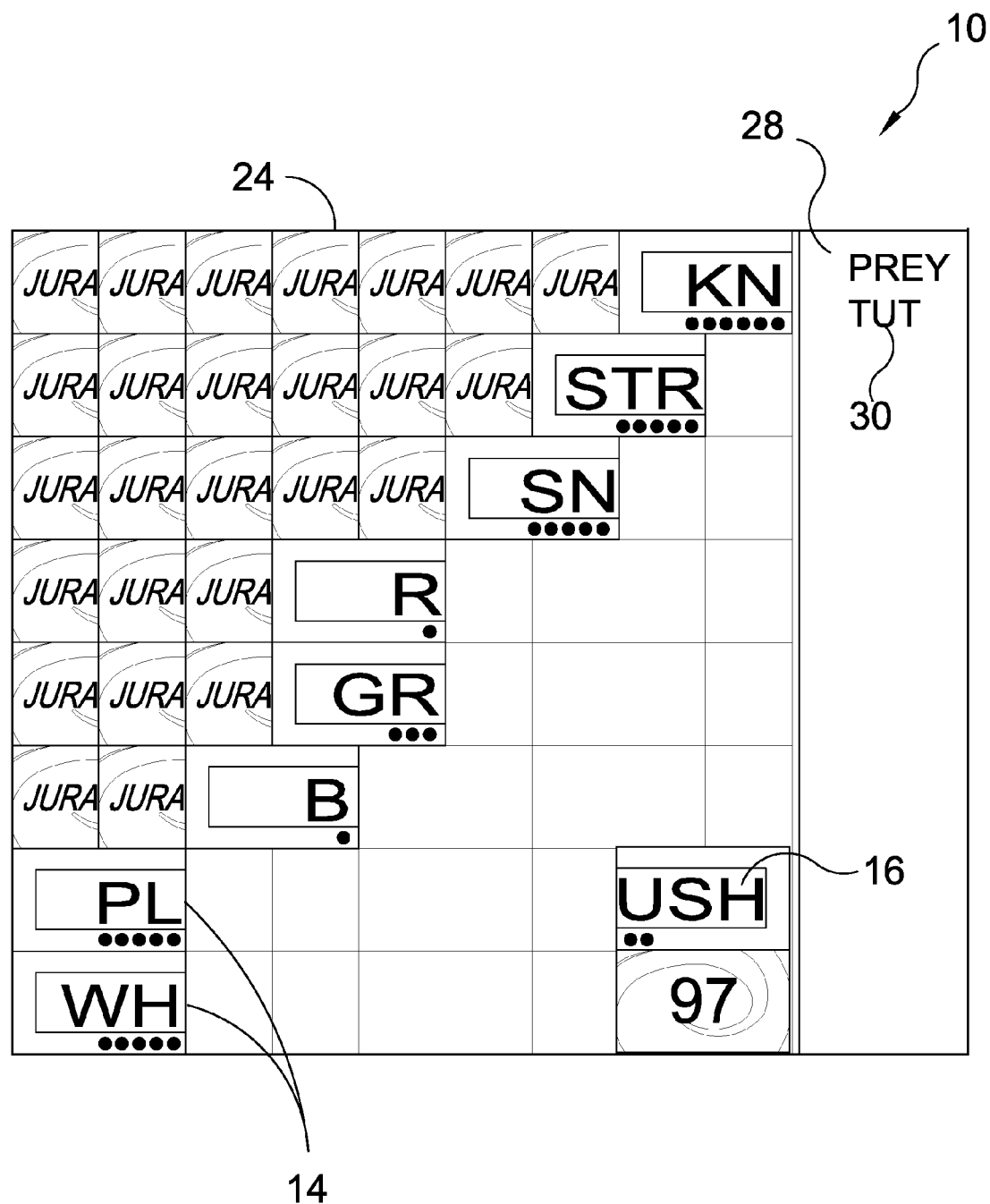
FIG. 6 is a front display view of the present invention in use.

FIG. 6 is the display of the present invention 10 with the game in process. When an onset unit 14 is matched with a rime unit 16 both word segments are removed from the board and the successful word 30 is listed in the word bank 28. The next rime in the revealed rime pile 16 becomes accessible and the next onset to the left of the one that was used is also turned face up and can be used in subsequent pairings.

Figure 7:
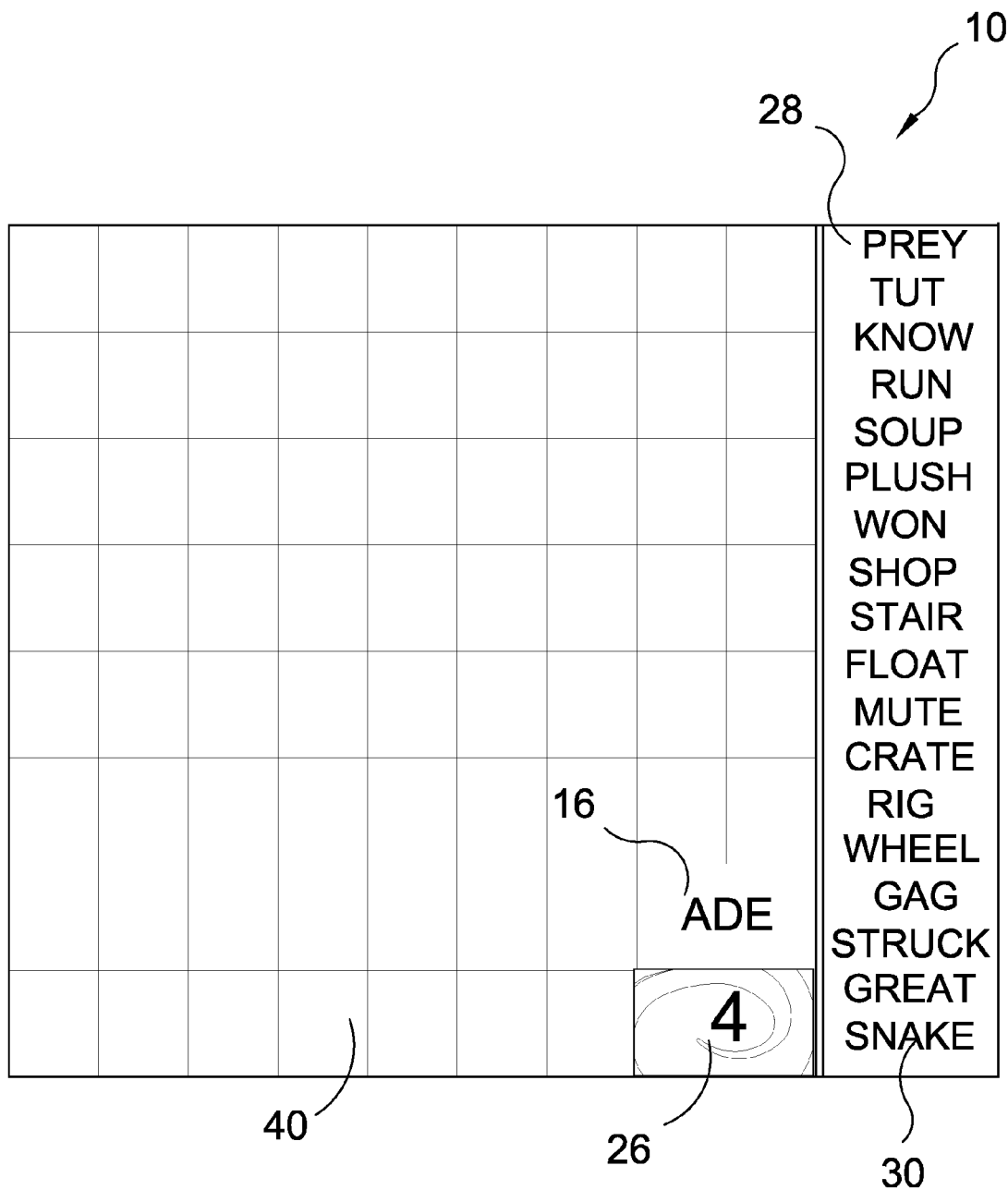
FIG. 7 is a display of a completed game.

FIG. 7 is a display of the present invention 10 after the successful completion of a game. Shown is the game grid 40 with all the onsets removed from the spread. Illustrated is that all onsets, which are unique for each game have been paired with game unique rimes 16 with each completed word 30 listed in the game's word bank 28. Since there are more rimes 16 than onsets in a game, there will be rimes remaining either revealed 16 or not 26 or both with the unrevealed rime pile 26 having a number displaying the number of remaining unrevealed rimes. A small number indicates a close game. The present invention also provides that indicia may be displayed, such as, "you won!" written over the space where the onset spread was displayed.

FIGS. 8A-C is a flow chart of the vocabulary game 10. Shown is a flow chart depicting the process and actions taken in order to play the game.

FIG. 9 is a display of additional elements of the microprocessor based vocabulary game 10. Shown is the present invention having additional game play elements such as a timer 34, aesthetically enhanced skins 36, differentiating grid sizes and adjustable difficulty and scoring values 38. Also shown is the multi-syllable button 42 that allows players to form words containing more than one rime.

FIG. 10 is an illustrative view of another additional element of the present invention 10 in use. Shown is that in certain variants of game play words may be formed alternatively utilizing two (or more) rimes 16 with an onset 14 as opposed to a single rime 16 to form larger more complex multi-syllable complete words 30.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of using a microprocessor based vocabulary game for teaching the proper use of onsets and rimes comprising the steps of:
   a) downloading the game program to a cellular electronic device;
   b) initializing said game;
   c) displaying a screen having a grid;
   d) a CPU breaking down a word bank into onsets in an onset spread and rimes with said onsets unrevealed and disposed on top to bottom left grids and proceeding to adjacent grids to the right and said rimes disposed in an unrevealed rime stack in the lower left hand grid;
   e) said CPU assigning values to appropriate onsets and rimes;
   f) revealing the rightmost onset in each row;

g) revealing the top three rimes from said unrevealed rime stack with only the third rime exposed;

h) combining a revealed onset with the exposed revealed rime to form a complete word; and i) validating said word.

2. The method of using a microprocessor based vocabulary game for teaching the proper use of onsets and rimes according to claim 1, whereupon validation of said onset-rime pair as a complete word said complete word is removed from said game grid and logged into the word bank.

3. The method of using a microprocessor based vocabulary game for teaching the proper use of onsets and rimes according to claim 2, whereupon removal of said word to said word bank the next onset in the row is revealed and the next rime is revealed.

4. The method of using a microprocessor based vocabulary game for teaching the proper use of onsets and rimes according to claim 3, wherein the process is repeated until no onsets are remaining and the player wins.

5. The method of using a microprocessor based vocabulary game for teaching the proper use of onsets and rimes according to claim 3, wherein the process is repeated until there are no unrevealed onsets in the onset spread.

6. The method of using a microprocessor based vocabulary game for teaching the proper use of onsets and rimes according to claim 5, wherein the onset with the highest point score that is also covering an unrevealed onset is moved to an empty row and unrevealed onset is revealed.

7. The method of using a microprocessor based vocabulary game for teaching the proper use of onsets and rimes according to claim 1, wherein determination that a combination is incorrect results in a return of said rime pile and play continues.

8. The method of using a microprocessor based vocabulary game for teaching the proper use of onsets and rimes according to claim 1, further including a game clock to be used for keeping time for said game.

9. The method of using a microprocessor based vocabulary game for teaching the proper use of onsets and rimes according to claim 8, wherein expiration of said game clock prior to having all said onsets removed from said grid results in the player losing the game.

10. The method of using a microprocessor based vocabulary game for teaching the proper use of onsets and rimes according to claim 9, wherein a new revealed rime can be appended to last word.

11. The method of using a microprocessor based vocabulary game for teaching the proper use of onsets and rimes according to claim 10, wherein a multi-syllable button is pressed.

12. The method of using a microprocessor based vocabulary game for teaching the proper use of onsets and rimes according to claim 11, wherein the validity of the complete word plus the second rime forming a real word is verified.

13. The method of using a microprocessor based vocabulary game for teaching the proper use of onsets and rimes according to claim 12, wherein a second syllable is added to a previous word in said word bank.

14. The method of using a microprocessor based vocabulary game for teaching the proper use of onsets and rimes according to claim 13, wherein the addition of said second syllable to said previous word doubles its total word score.

15. The method of using a microprocessor based vocabulary game for teaching the proper use of onsets and rimes according to claim 1, wherein use of all said rimes from said revealed rime pile results in three rimes from said unrevealed rime pile being turned up on revealed rime pile with only the third rime exposed and continuing as such until the end of game play as there are more said rimes than said onsets.

16. The method of using a microprocessor based vocabulary game for teaching the proper use of onsets and rimes according to claim 1, further including an aesthetic skin.

17. The method of using a microprocessor based vocabulary game for teaching the proper use of onsets and rimes according to claim 1, further including a game difficulty rating.

* * * * *